United States Patent
Orimoto

(10) Patent No.: US 6,752,540 B2
(45) Date of Patent: Jun. 22, 2004

(54) CAMERA

(75) Inventor: Masaaki Orimoto, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/677,326

(22) Filed: Oct. 3, 2003

(65) Prior Publication Data

US 2004/0076420 A1 Apr. 22, 2004

(30) Foreign Application Priority Data

Oct. 17, 2002 (JP) ........................................ 2002-303229

(51) Int. Cl.$^7$ ............................................ G03B 17/00
(52) U.S. Cl. ...................... 396/349; 396/448; 359/511
(58) Field of Search ................................ 396/348, 349, 396/448; 359/511

(56) References Cited

U.S. PATENT DOCUMENTS

| 5,761,556 A | * | 6/1998 | Ichino ........................ 396/349 |
| 6,312,168 B1 | * | 11/2001 | Naruse et al. .............. 396/349 |
| 6,443,634 B1 | * | 9/2002 | Tsuboi ........................ 396/448 |
| 2003/0049031 A1 | * | 3/2003 | Nagae ........................ 396/448 |

FOREIGN PATENT DOCUMENTS

JP    07-049515 B2    2/1995

* cited by examiner

Primary Examiner—David M. Gray
(74) Attorney, Agent, or Firm—Sughrue Mion, PLLC

(57) ABSTRACT

It is an object of the present invention to provide a camera having its size reduced by improving the arrangement of a backlash compensating mechanism and a lens barrier opening and closing mechanism for a barrel that can be extended and collapsed. According to the present invention, a shared mechanism is used to open a lens barrier and to compensate backlash occurring between a first lens group holding frame and a second lens group holding group.

2 Claims, 7 Drawing Sheets

CAMERA

BACKGROUND OF THE INVENTION

1. Field of the Invention

The present invention relates to a camera having a lens barrel that can be extended and collapsed between a predetermined extended position and a predetermined collapsed position, the camera taking images by capturing object light incident via an image taking lens set in the extended position.

2. Description of the Related Art

Camera have hitherto been known which contain an image taking lens composed of multiple lens groups, have a lens barrel that can be extended and collapsed between a predetermined extended position and a predetermined collapsed position, and takes images by capturing object light incident via the image taking lens set in the extended position.

Some of these cameras have a lens barrier that is closed when the lens barrel is in the predetermined collapsed position and that is opened when the lens barrel is brought into the predetermined extended position (for example, refer to Patent Document 1).

Further, the lens barrel, which is extended and collapsed, is provided with a backlash compensating mechanism in order to allow images to be taken more accurately.

<Patent Document 1>

Japanese Patent Laid-Open No. 7-49515

In this case, when the lens barrel is provided with a lens barrier opening and closing mechanism and a backlash compensating mechanism, the size of the lens barrel increases because it is provided with various other parts. This may hinder efforts to reduce the size of the camera.

SUMMARY OF THE INVENTION

In view of the above circumstances, it is an object of the present invention to provide a camera having its size reduced by improving the arrangement of a backlash compensating mechanism and a lens barrier opening and closing mechanism for a lens barrel that can be extended and collapsed.

To accomplish this object, the present invention provides a camera containing an image taking lens composed of multiple lens groups and having a lens barrel that can be extended and collapsed between a predetermined extended position and a predetermined collapsed position, the camera taking images by capturing object light incident via the image taking lens set in the extended position:

the lens barrel has:

a first lens group holding section that holds a first lens group of the multiple lens groups which is disposed at a front position; and a second lens group holding section that holds a second lens group disposed adjacent to and behind the first lens group, and the first lens group holding section holds the first lens group and a lens barrier that can be freely opened and closed to cover a front surface of the first lens group and that is urged in a direction in which the lens barrier is closed, and the first lens group holding section further has a lens barrier opening member that opens the lens barrier when urged backward, while allowing the lens barrier to be moved in the closed direction when the urging is relieved, and the lens barrier further has an elastic member connecting the second lens group holding section and the lens barrier opening member of the first lens group holding section together, and urges the lens barrier opening member toward the second lens holding member as the lens barrel is moved to the extended position, while relieving the urging as the lens barrel is moved to the collapsed position.

With the camera according to the present invention, the opening of the lens barrier interacts with the compensation of backlash occurring between the first lens group holding section and the second lens group holding section. Consequently, unlike the independent provision of a mechanism that opens the lens barrier and a mechanism that prevents the camera from shaking, the camera according to the present invention allows a shared mechanism to achieve these mechanisms thereby simplifying these mechanisms to contribute to a reduction in the size of the camera.

In this case, the second lens group holding section may have a projection that contacts with the lens barrier opening member to push the lens barrier opening member forward when the lens barrel is moved to the collapsed position, and the lens barrier opening member may be pushed by the projection to allow the lens barrier to be moved in the closed direction.

This arrangement allows the closure of the lens barrier to be controlled using a simple mechanism.

According to the camera of the present invention, it is possible to reduce the sizes of a backlash compensating mechanism and lens barrier opening and closing mechanism of a lens barrel that can be extended and collapsed.

DETAILED DESCRIPTION OF THE PREFERRED EMBODIMENTS

An embodiment of the present invention will be described below.

Figure 1:
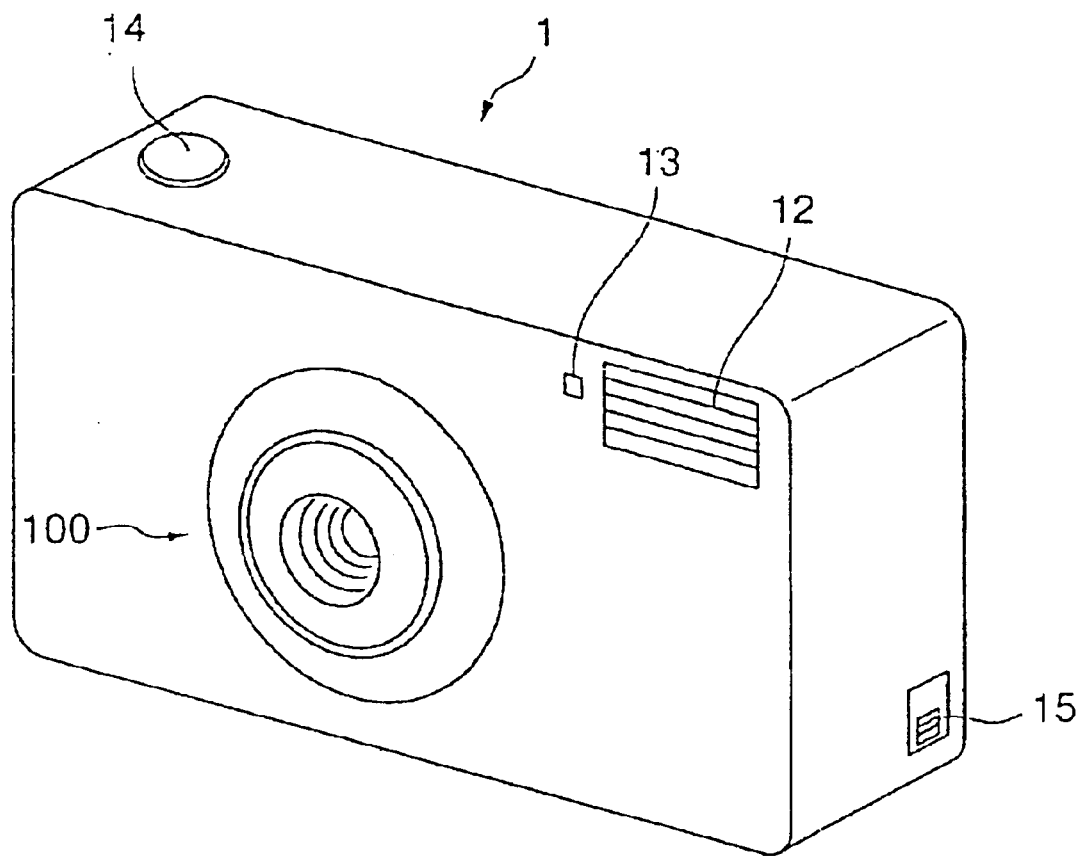
FIG. 1 is a perspective view showing the appearance of an embodiment of a camera according to the present invention.
Figure 2:
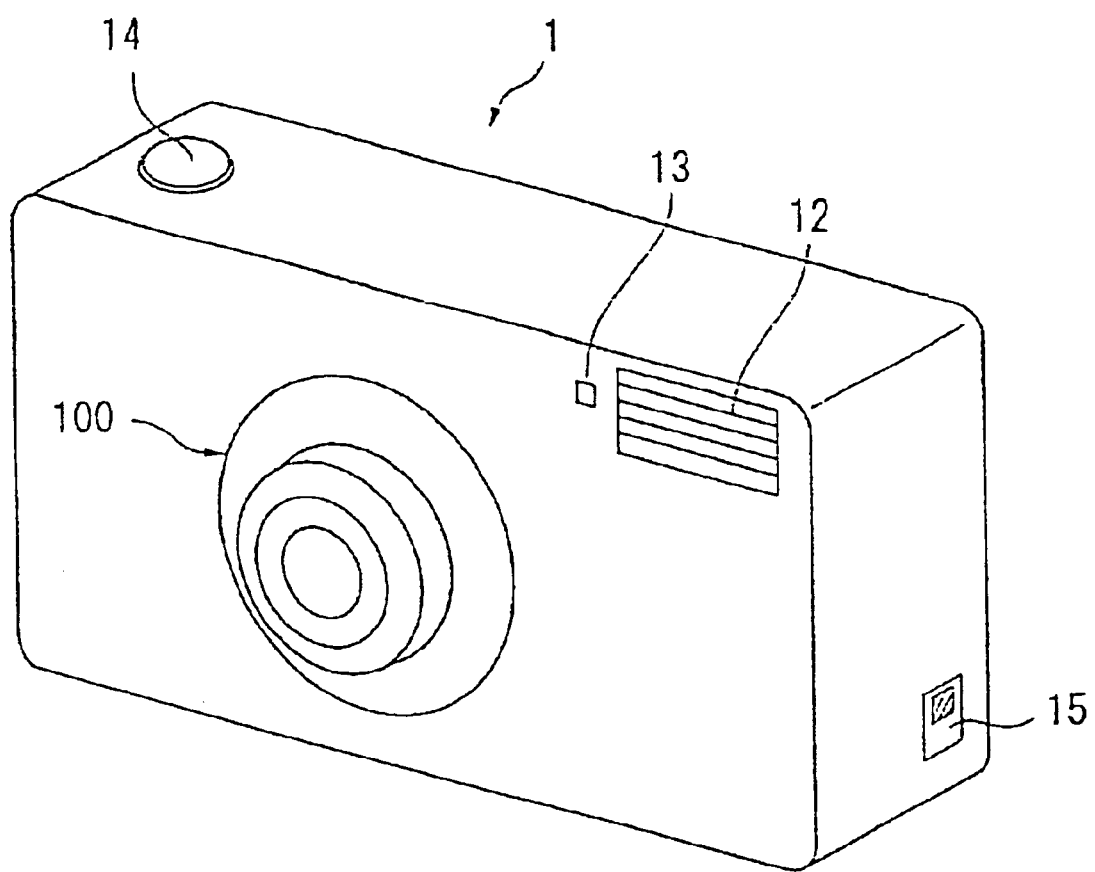
FIG. 2 is a perspective view showing the appearance of the embodiment of the camera according to the present invention.

FIGS. 1 and 2 are perspective views showing the appearance of an embodiment of a camera according to the present invention.

FIG. 1 shows of a camera 1 according to the present embodiment, in which a lens barrel 100 containing a zoom lens is collapsed. FIG. 2 shows an extended state in which a lens barrier of the lens barrel 100 of the camera 1 is opened.

The lens barrel 100 of the camera 1, shown in FIGS. 1 and 2, contains a first lens group located in a front position of the camera, a second lens group located adjacent to and behind the first lens group, and a third lens group located closer to a rear surface of the camera.

A flash light emitting window 12 and a finder objective window 13 are arranged in the upper part of a front surface of the camera 1, shown in FIGS. 1 and 2. Further, a shutter button 14 is arranged on a top surface of the camera 1.

A power switch 15 is provided in a left side of the camera 1, shown in FIGS. 1 and 2. When the power switch 15 is pushed upward to turn on a power supply, the lens barrel 100, which is collapsed as shown in FIG. 1, is extended into the lens barrier open state shown in FIG. 2. Further, a zoom operation switch is disposed on a rear surface (not shown) of the camera 1. When one side of the zoom operation switch is depressed, the lens barrel 100, which is in the state shown in FIG. 2, is extended toward a telephotographic side (frontward) as long as the user depresses the switch. When the other side of the zoom operation switch is depressed, the lens barrel 100 is moved to a wide angle side (backward) as long as the user depresses the switch; the limit of this operation corresponds to the state shown in FIG. 2. Accordingly, the state shown in FIG. 2 corresponds to the case in which the zoom is set for the limit of the movement toward the wide angle side. The power switch 15 is pushed downward to return the extended lens barrel to the collapsed state shown in FIG. 1, while turning off the power supply.

Further, the camera 1 is provided with a solid image taking element 400 behind the third lens group. In the camera 1, object light having passed through the image taking lens forms an object image on the solid image taking element. When the shutter button 14 is turned on, image data representative of the object image formed on the solid image taking element is recorded to take an image.

Figure 3:
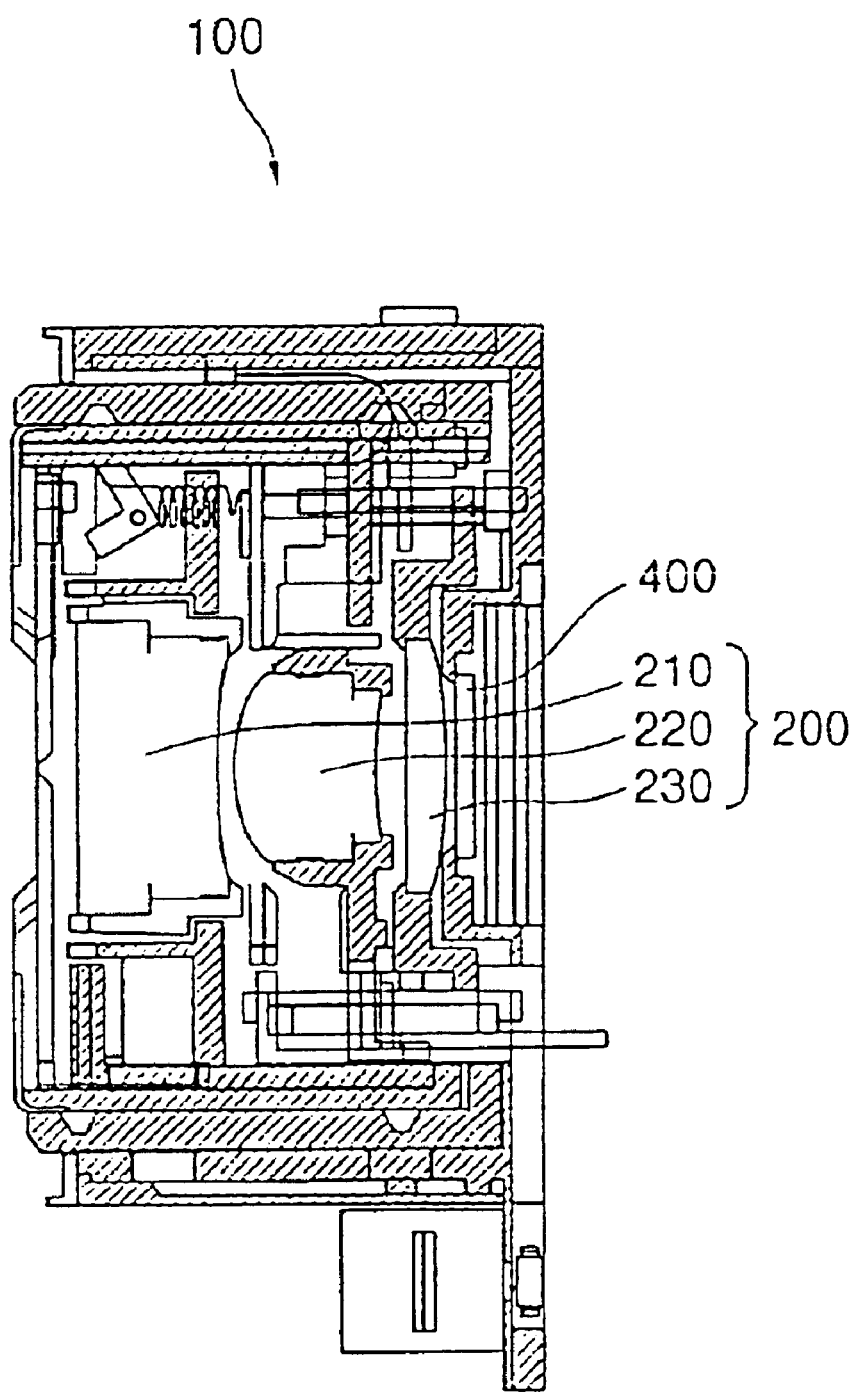
FIG. 3 is a sectional view taken along an optical axis in which a lens barrel of the camera is collapsed.
Figure 4:
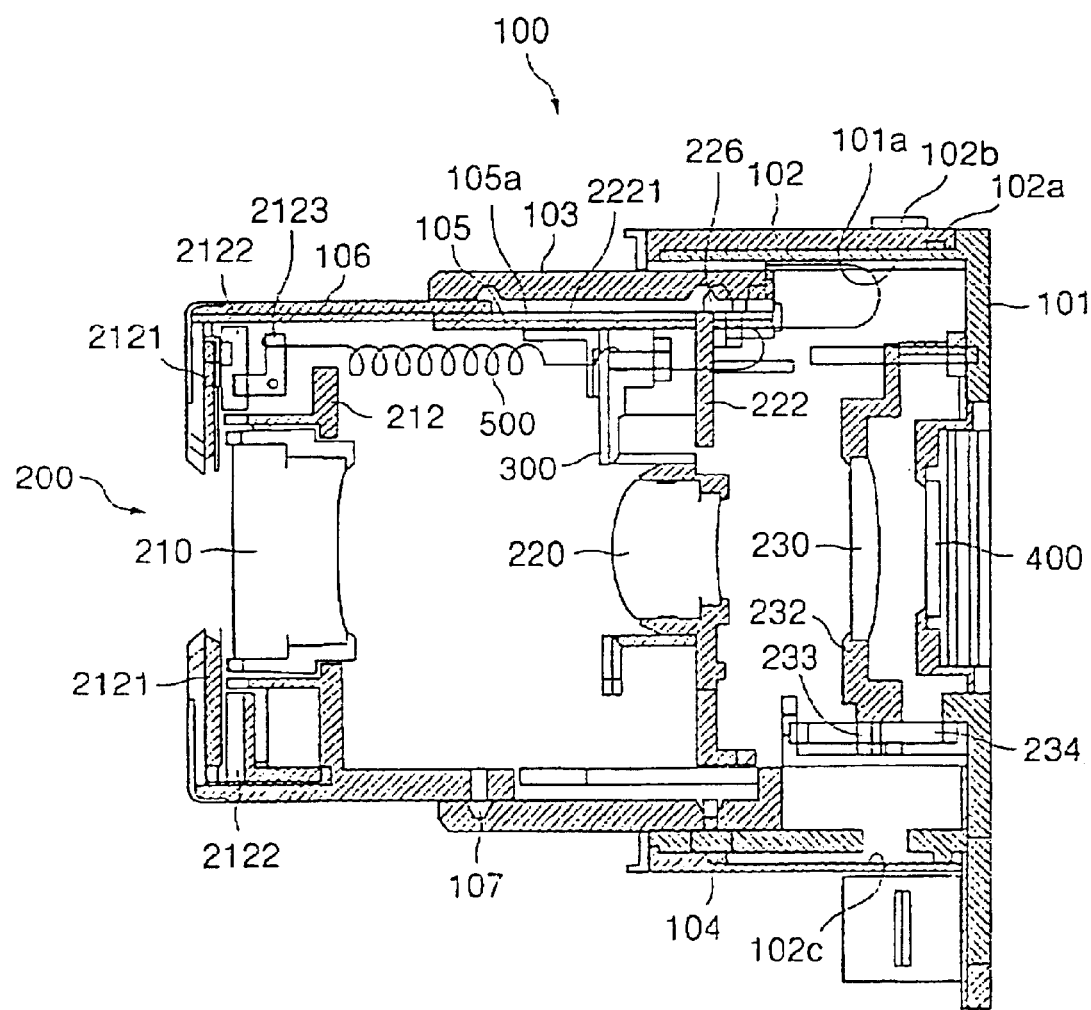
FIG. 4 is a sectional view taken along the optical axis in which the lens barrel is maximally extended.

FIG. 3 is a sectional view taken along an optical axis in which the lens barrel of the camera is collapsed. FIG. 4 is a sectional view taken along the optical axis in which the lens barrel is maximally extended.

The lens barrel 100 is provided with an image taking lens 200 composed of a first lens group 210, a second lens group 220, and a third lens group 230. The lens barrel 100 can be collapsed and extended between the collapsed state shown in FIG. 3 and the maximally extended state shown in FIG. 4.

As described previously, the lens barrel 100 is moved between the minimally extended state shown in FIG. 2 and in which it is slightly extended forward to open the lens barrier and the maximally extended state shown in FIG. 4. Thus, the lens barrel 100 is moved in the direction of the optical axis so as to vary the focal length of the lens groups 210, 220, and 230 as a whole, which constitute the image taking lens 200, provided in the lens barrel 100. Further, the focus is adjusted by moving only the third lens group 230 of the image taking lens 200 in the direction of the optical axis.

Further, in the lens barrel 100, a lens shutter 300 is disposed between the first lens group 210 and the second lens group 220.

Furthermore, FIGS. 3 and 4 show that a CCD image taking element 400 fixed to a fixing frame 101 in turn fixed to a camera body is provided behind the image taking lens 200.

Here, description will be given of operations of the lens barrel 100 performed between the collapsed state shown in FIGS. 1 and 3 and the maximally extended state shown in FIG. 4.

The lens barrel 100 is provided with the fixing frame 101, fixed to the camera body, and a driving cylinder 102 that can be rotated relative to the fixing frame. Although the driving cylinder 102 can be rotated relative to the fixing frame 101, it is prohibited from moving in the direction of the optical axis relative to the fixing frame 101. This is because a projection 102a provided in a circumferential direction is fitted in a groove in the fixing frame 101 which extends in the circumferential direction. The driving cylinder 102 has a gear 102b provided on its outer peripheral surface. Further, a driving gear (not shown) is meshed with the gear 102b. Accordingly, a driving force from a motor (not shown) is transmitted via the gear 102b to rotate the driving cylinder 102.

The driving cylinder 102 is further provided with a key groove 102c extending in the direction of the optical axis. A cam pin 104 fixed to the rotative moving cylinder 103 projects into the key groove 102c through a cam groove formed in the fixing frame 101. Accordingly, when the driving cylinder 102 is rotated, the rotative moving cylinder 103 is rotated together with the driving cylinder 102 because the cam pin 104 projects into the key groove 102c. Furthermore, since the cam pin 104 penetrates the cam groove in the fixing frame 101, it is moved in the direction of the optical axis in accordance with the shape of the cam groove while rotating together with the driving cylinder 102.

Further, a rectilinear moving frame 105 is provided inside the rotative moving cylinder 103.

The rectilinear moving frame 105 is engaged with the rotative moving cylinder 103 so as to be rotatable relative to the rotative moving cylinder 103. Further, the rectilinear moving frame 105 is fitted into the key groove 101a in the fixing frame 101 and thus prohibited from rotating. Therefore, when rotation of the driving cylinder 102 causes the rotative moving cylinder 103 to move in the direction of the optical axis, the rectilinear moving frame 105 moves together with the rotative moving cylinder 103. However, the rectilinear moving frame 105 is fitted into the key groove 101a in the fixing frame 101 and thus prohibited from rotating. Consequently, the rectilinear moving frame 105 moves rectilinearly in the direction of the optical axis as the rotative moving cylinder 103 moves.

Further, the second lens group 220 is held by a second lens group holding frame 222. A cam pin 226 fixed to the second lens group holding frame 222 projects into the cam groove in the rotative moving cylinder 103 and into a key groove 105a in the rectilinear moving frame 105 which extends in the direction of the optical axis. Accordingly, as the rotative moving cylinder 103 moves rotatively in the direction of the optical axis in unison with the rotation of the driving cylinder 102, the second lens group holding frame 222 and the second lens group 220, held by the second lens group holding frame 222, are rectilinearly moved in the direction of the optical axis in accordance with the shape of the cam groove in the rotative moving cylinder 103, into which the cam pin 226 is fitted.

Further, the lens shutter 300 is attached to the second lens group holding frame 222 so as to be urged forward by a coil spring (not shown). Thus, the lens shutter 300 is also moved in the direction of the optical axis together with the second lens group 220.

Furthermore, the lens barrel 100 is provided with a rectilinear moving cylinder 106, which holds the first lens group 210. A cam pin 107 fixed to the rectilinear moving frame 106 projects into the cam groove in the rotative moving cylinder 103 and into the key groove 105a in the rectilinear moving frame 105, which extends in the direction of the optical axis. Accordingly, as the rotative moving cylinder 103 moves rotatively in the direction of the optical axis in unison with the rotation of the driving cylinder 102, the rectilinear moving cylinder 106 is rectilinearly moved in the direction of the optical axis in accordance with the shape of the cam groove in the rotative moving cylinder 103, into which the cam pin 107 is fitted.

The lens barrel 100 is extended as described above and is collapsed by rotating the driving cylinder 102 in the opposite direction.

In the third lens group 230 of the image taking lens 200, a lead screw 234 is rotated by a driving source (not shown) and is screwed into a nut 233 integrally held by the third lens group holding frame 232, which also holds the third lend group 230. Accordingly, as the lead screw 234 rotates, the third lens group 230 is moved in the direction of the optical axis to adjust the focus.

In this case, the first lens,holding member 212, fixed to the rectilinear moving cylinder 106, is provided with a lens barrier 2121, a ring 2122, and a ring rotative-moving lever 2123, described later.

Further, the second lens group holding member 222 is provided with a projection 2221. The projection 2221 is connected by a spring 500 to the ring rotative-moving lever 2123, provided on the first lens group holding member 212.

The lens barrier 2121 is composed of two generally L-shaped plate pieces. In FIGS. 3 and 4, the plate pieces of the lens barrier 2121 move down and up, respectively, to the center of the first lens group to protect the first lens group. In these figures, the plate pieces of the lens barrier 2121 move up and down, respectively, to their original positions to expose the first lens group.

Then with reference to FIG. 5 description will be given of an opening and closing operations of the lens barrier.

Figure 5:
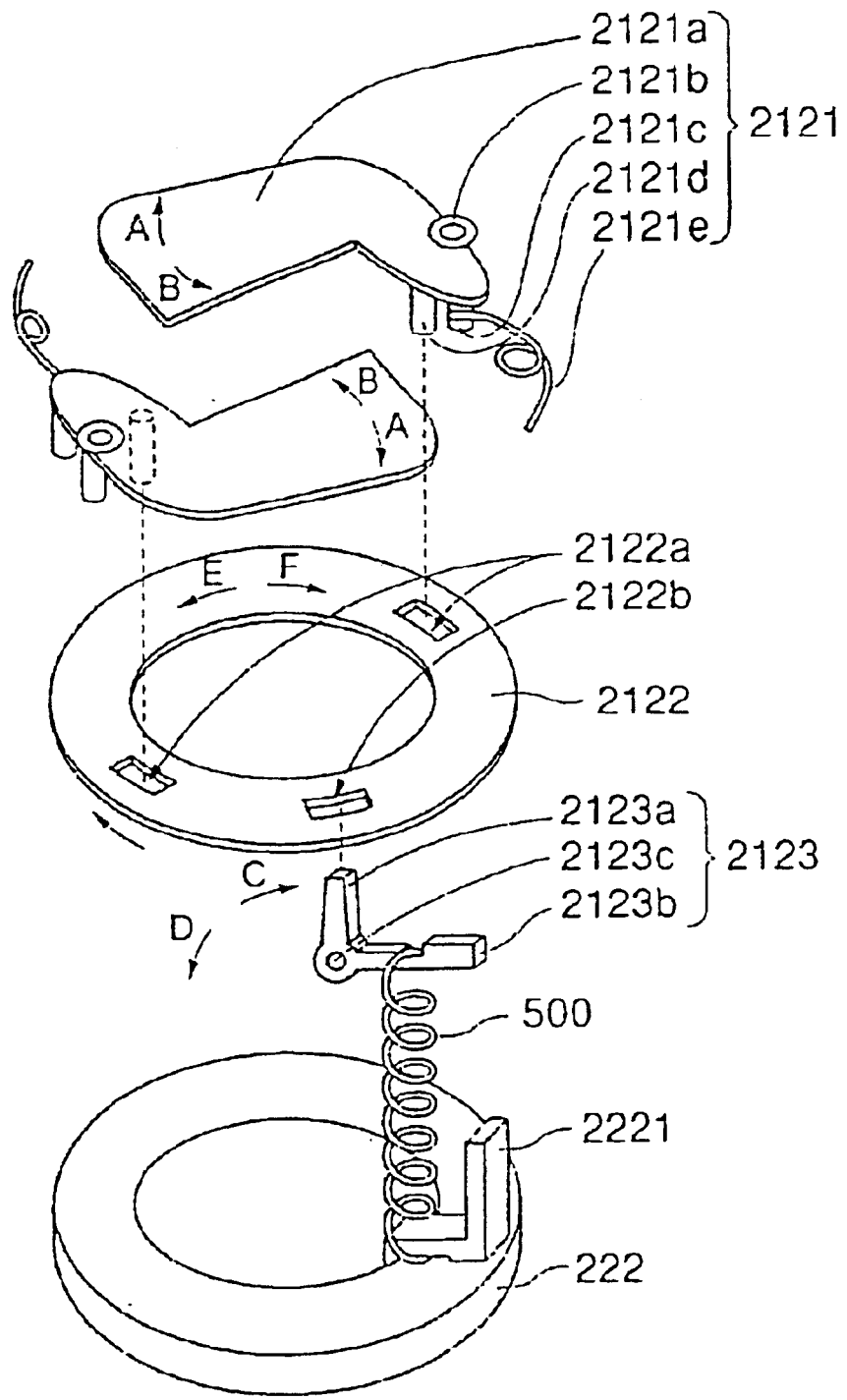
FIG. 5 is a schematic view showing a configuration of a lens barrier opening and closing mechanism provided in the lens barrel.

FIG. 5 is a schematic view showing a configuration of a lens barrier opening and closing mechanism provided in the lens barrel.

FIG. 5 shows the lens barrier 2121, composed of the two plate pieces 2121a and a torsion spring 2121e that urges the plate pieces 2121a in a direction in which the barrier is closed, the ring 2122, through which a part of the plate piece is inserted, the ring rotative-moving lever 2123, used to move the ring rotatively, the spring 500, and the projection 2221, provided on the second lens group holding frame 222, in this order from the top to bottom of this figure.

The two plate pieces of the lens barrier 2121 move in the direction of an arrow B as described above and are thus superimposed on each other to protect the lenses. The two plates superimposed on each other at the center of the lenses move back in the direction of an arrow A to expose the lenses.

The plate piece 2121a is provided with a rotating shaft 2121b supported on a part of the first lens group holding member 212, a guide projection 2121d inserted into a guide slot 2122a formed in the ring 2122, and a spring receiving projection 2121c that receives from the torsion spring 2121e an urging force for moving the plate piece in the direction of the arrow B. That is, the torsion spring 2121e urges the lens barrier 2121 so as to move it in the direction in which it is closed.

The ring 2122 is formed with the two guide slots 2122a, into which the respective guide projections 2121d, provided on the respective plates 2121a, constituting the lens barrier 2121, are inserted, as described. The ring 2122 is also formed with a lever slot 2122b into which an end 2123a of the L-shaped ring rotative-moving lever 2123 is inserted.

Since the end 2123a of the ring rotative-moving lever 2123 is inserted into the lever slot 2122b, when the spring 500, connected to the second lens group holding frame 222, urges the ring rotative-moving lever 2123 toward the second lens group holding frame, the ring rotative-moving lever 2123 is rotatively moved in the direction of an arrow C around a rotating shaft 2123c supported on a part of the first lens group holding frame 212. Thus, the ring 2122 is rotatively moved in the direction of an arrow E. When the ring 2122 is moved in this way, the guide projection 2121d, inserted into the guide slot 2122a of the ring, moves together with the ring. The two plate pieces are thus rotatively moved in the direction of the arrow A, i.e. the lens barrier is opened.

At this time, the urging force of the spring 500, which connects the ring rotative-moving lever 2123, provided in the first lens group holding frame 212, and the second lens group holding frame together causes the cam pin 107 of the rectilinear moving cylinder 106, to which the first lens group holding frame 212 is fixed, to move closer to the cam pin 226, fixed to the second lens group holding frame 222. These cam pins are biased in the grooves into which they are fitted, i.e. the camera is prevented from shaking. The ring rotative-moving lever 2123 can be rotatively moved until the end 2123a points in the direction of the optical axis.

On the other hand, when the lens barrel 100 has moved beyond the barrier open position shown in FIG. 2 and approaches the collapsed position shown in FIG. 1, the first lens group holding frame 212 approaches the second lens group holding frame 222. Then, the projection 2221, provided on the second lens group holding frame, pushes the other end 2123b of the ring rotative-moving lever 2123. The ring rotative-moving lever 2123 is thus rotatively moved in the direction of an arrow D. In unison with this movement, the ring is rotatively moved in the direction of an arrow F. The lens barrier is thus moved in the direction in which it is closed.

Figure 6:
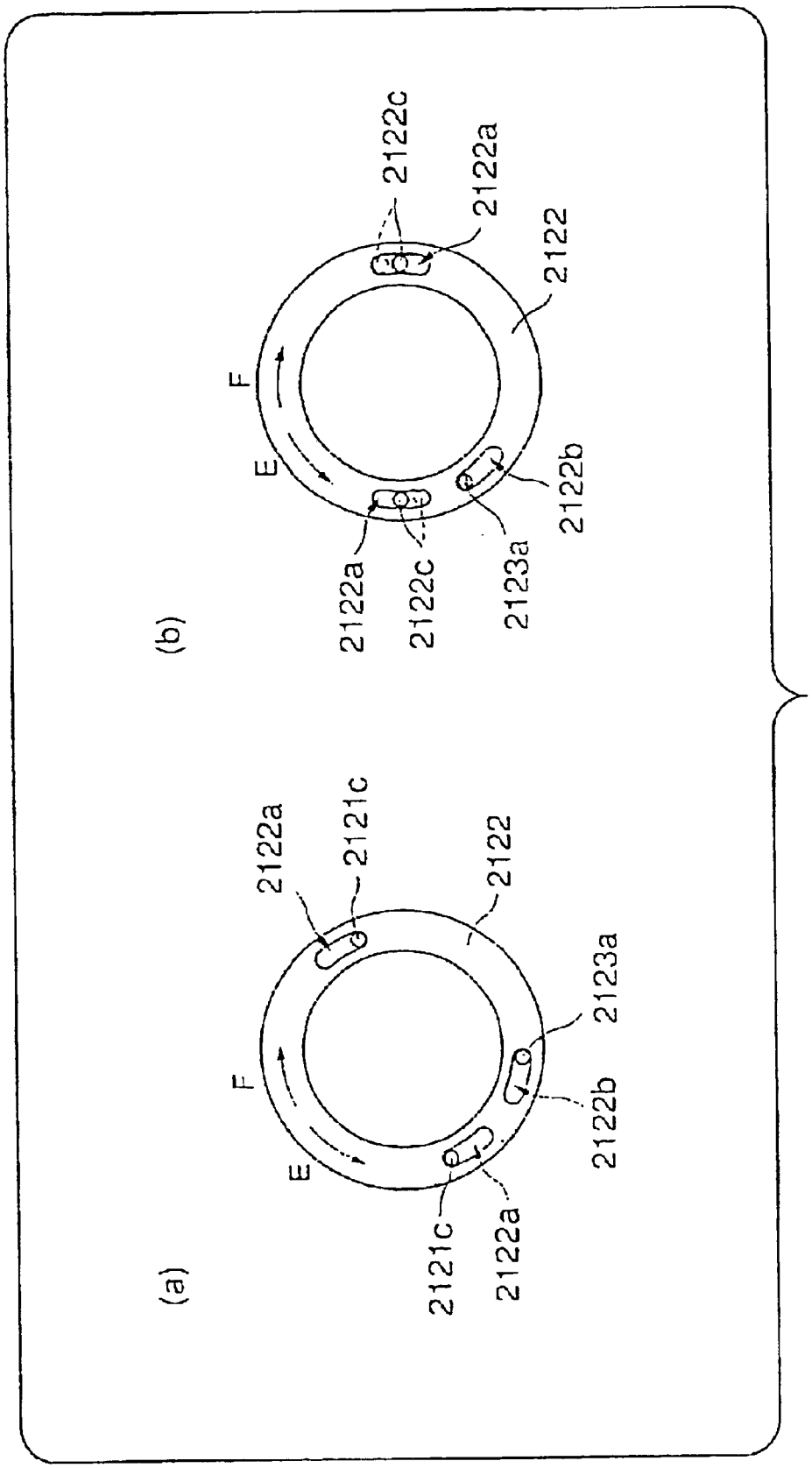
FIG. 6 shows that the ring is being rotatively moved by a ring rotative-moving lever.

FIG. 6 shows that the ring is being rotatively moved by the ring rotative-moving lever.

Part (a) of FIG. 6 shows the positional relationship between the ring 2122 and the ring rotative-moving lever 2123 observed if the lens barrel 100 is moved to its extended position in which the lens barrier is opened. The ring 2122 has been rotatively moved in the direction of the arrow E in unison with the movement, in the direction of the arrow C, shown in FIG. 5, of the end 2123a of the ring rotative-moving lever inserted into the lever slot 2122b. In this state, the guide projection 2121c inserted into the guide slot 2122a has been moved by the ring 2122 in the direction of the arrow E against the urging force of the torsion spring 2121e. In this case, the lens barrier is open.

Part (b) of FIG. 6 shows the positional relationship between the ring 2122 and the ring rotative-moving lever 2123 observed if the lens barrel 100 is moved to its collapsed position in which the lens barrier is closed. The ring 2122 has been rotatively moved in the direction of the arrow F in unison with the movement, in the direction of the arrow D, shown in FIG. 5, of the end 2123a of the ring rotative-moving lever inserted into the lever slot 2122b. In this state, the guide projection 2121c inserted into the guide slot 2122a is returned by the ring to the position shown by a dotted circle. Subsequently, the guide projection 2121c is returned by the urging force of the torsion spring 2121e, shown in FIG. 5, to the position shown by a solid circle. Thus, the lens barrier is completely closed. Compared to the direct complete closure of the lens barrier by the ring, the above operation obviates the need to exert an excessive force on the lens barrier owing to positional errors.

Figure 7:
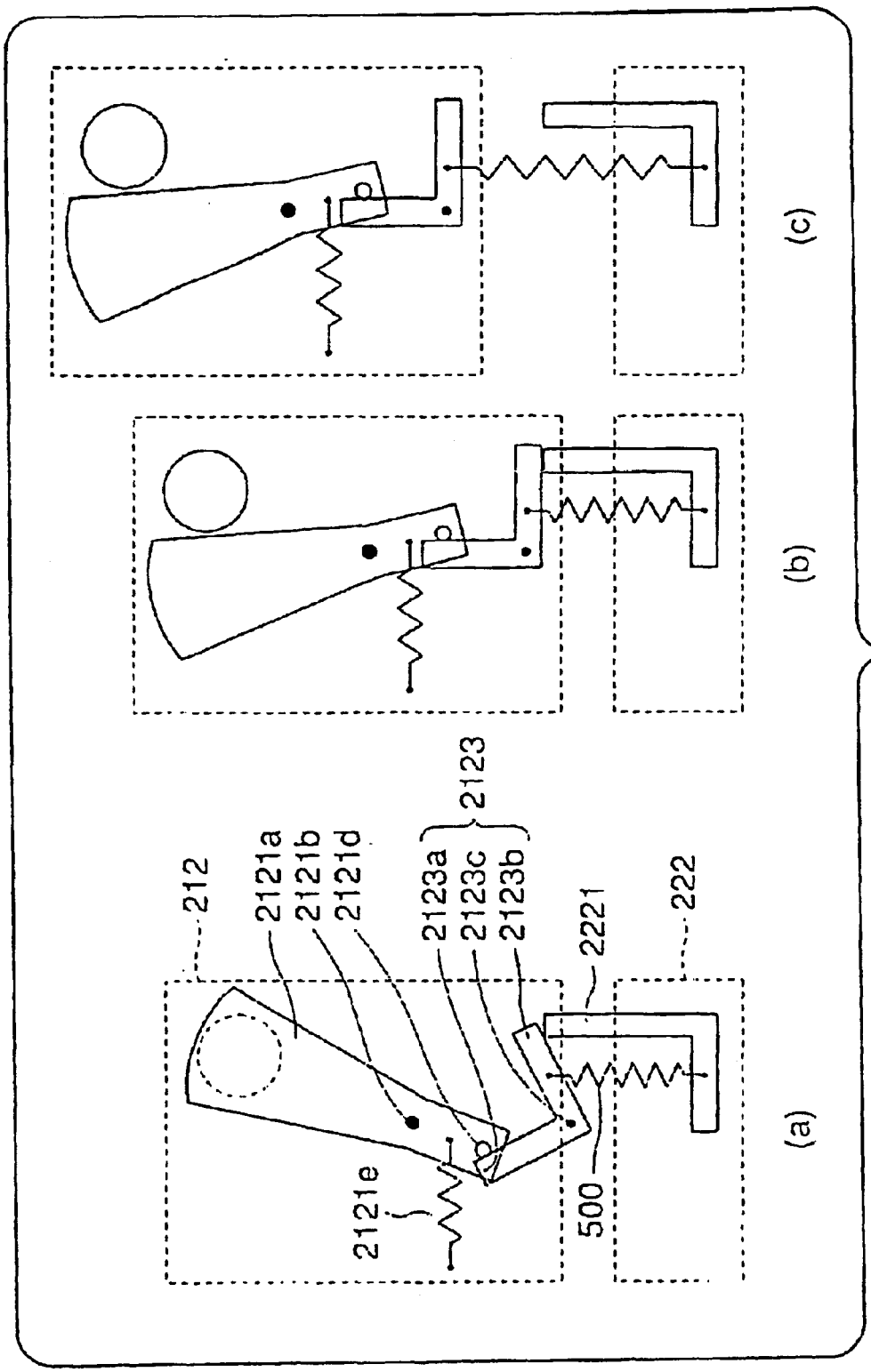
FIG. 7 is a conceptual drawing showing operations of the lens barrier opening and closing mechanism.

FIG. 7 is a conceptual drawing showing operations of the above lens barrier opening and closing mechanism.

FIG. 7 shows a mechanism that is actually different from but conceptually the same as the lens barrier opening and closing mechanism in the camera 1 according to the present embodiment. The upper part of each one of parts (a) to (c) is a schematic view representative of the first lens group holding frame 212. The lower part of each one of parts (a) to (c) is a schematic view representative of the second lens group holding frame 222. Among members constituting the lens barrier opening and closing mechanism shown in FIG. 7, the members having the same functions as those shown in FIG. 5 are denoted by the same reference numerals as those shown in FIG. 5.

Part (a) of FIG. 7 shows the state of the lens barrier opening and closing mechanism in which the lens barrel is collapsed as shown in FIG. 1. Part (b) of FIG. 7 shows the state of the lens barrier opening and closing mechanism in which the lens barrel is extended as shown in FIG. 2. Part (c) of FIG. 7 shows the state of the lens barrier opening and closing mechanism in which the lens barrel is maximally extended as shown in FIG. 4.

In the collapsed position shown in part (a) of FIG. 7, the ring rotative-moving lever 2123 is pushed by the projection 2221, provided on the second lens group holding member 222. The ring rotative-moving lever 2123 is thus rotatively moved around the shaft 2123c in the direction in which the force for opening the lens barrier 2121a is weakened. Thus, the torsion spring 2121e, connected to the lens barrier, exerts an urging force for moving the lens barrier in the closing direction and surpassing the above weakened force.

When the lens barrel is extended from its collapsed position to its position slightly in front of the camera, e.g. from the state shown in part (a) of FIG. 7 to the state shown in part (b) of FIG. 7, the ring rotative-moving lever 2123 is released from the pressure exerted by the projection 2221. The ring rotative-moving lever 2123 is then rotatively moved around the shaft 2123b to open the lens barrier. This is because the force of the spring 500 which urges the ring rotative-moving lever 2123 toward the second lens group holding member surpasses the urging force of the torsion spring 2121e.

If the lens barrel is maximally extended as shown in the state in part (c) of FIG. 7, to which the state in part (b) of FIG. 7 has shifted, the urging force of the torsion spring 2121e is still surpassed by the force of the spring 500 which urges the lens rotative-moving lever 2123 toward the second lens group holding member.

As described above, in the present embodiment, the shared mechanism is used to achieve the lens barrier opening and closing mechanism and the mechanism compensating backlash occurring between the first lens group holding frame and the second lens group holding frame. Accordingly, compared to the independent provision of the respective mechanisms, the present embodiment simplifies the mechanisms of the camera. Therefore, the present invention contributes to reducing the size of the camera.

In the example of the present embodiment, the camera is provided with the projection that contacts with and pushes the lens barrier. However, the present invention is not limited to this aspect.

Further, in the description of the present embodiment, the image taking lens is composed of the three lens groups. However, the present invention is applicable to image taking lenses composed of more or less lens groups, e.g. two or four lens groups.

Furthermore, in the description of the example of the present embodiment, the zoom lens is used as the image taking lens. However, the present invention does not require the image taking lens to be a zoom lens but is applicable to, for example, cameras which enables the lens barrel to be freely collapsed and extended and which maintains, for example, a fixed focus length in the extended state. In the example described in the present embodiment, the spring is employed as an elastic member. However, the present invention is not limited to this aspect.

Further, in connection with the lens shutter, the present embodiment has not referred to the relationship between a shutter blade and a diaphragm. However, in this lens shutter, the shutter blade may also be used as the diaphragm blade or the diaphragm may be provided separately from the shutter blade.

Moreover, in the description of the present embodiment, the electronic camera having the CCD image taking element has been taken by way of example. However, the application of the present invention is not limited to electronic cameras. The present invention can be applied to cameras that take photographs on silver films by providing them with a light blocking lens barrier, a front cover, or the like.

What is claimed is:

1. A camera containing an image taking lens composed of a plurality of lens groups and comprising a lens barrel that can be extended and collapsed between a predetermined extended position and a predetermined collapsed position, the camera taking images by capturing object light incident via the image taking lens set in the extended position, the lens barrel comprising:

a first lens group holding section that holds a first lens group of the plurality of lens groups which is disposed at a front position; and wherein a second lens group holding section that holds a second lens group disposed adjacent to and behind the first lens group, and wherein the first lens group holding section holding the first lens group and a lens barrier that can be opened and closed to cover a front surface of the first lens group and that is urged in a direction in which the lens barrier is closed, the first lens group holding section further comprising a lens barrier opening member that opens the lens barrier when urged backward, while allowing the lens barrier to be moved in the closed direction when the urging is relieved, the lens barrel further comprising an elastic member connecting the second lens group holding section and the lens barrier opening member of the first lens group holding section together, and the lens barrier opening member toward the second lens holding member as the lens barrel is moved to the extended position, while relieving the urging as the lens barrel is moved to the collapsed position.

2. The camera according to claim 1, wherein the second lens group holding section comprises a projection that contacts with the lens barrier opening member to push the lens barrier opening member forward when the lens barrel is moved to the collapsed position, and the lens barrier opening member is pushed by the projection to allow the lens barrier to be moved in the closed direction.

* * * * *